March 12, 1935.  A. E. THORNBERG  1,993,868
FISH LURE
Filed March 25, 1932
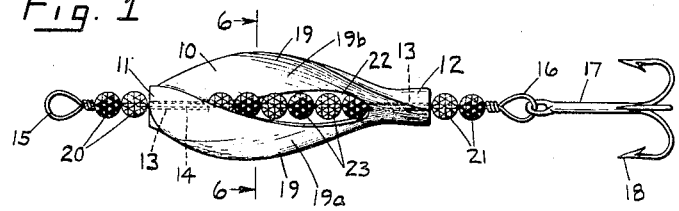
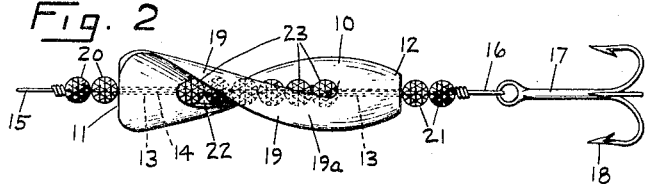
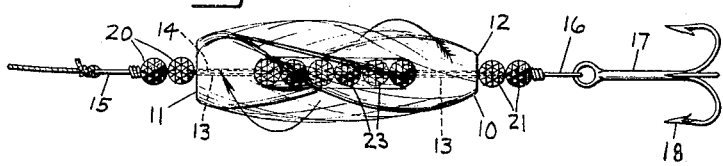
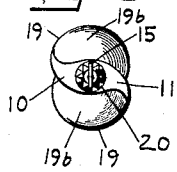 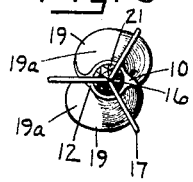 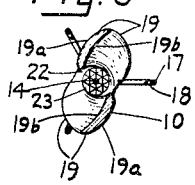
INVENTOR.
Axel E. Thornberg
BY
ATTORNEY Patented Mar. 12, 1935

1,993,868

UNITED STATES PATENT OFFICE 1,993,868

FISH LURE

Axel E. Thornberg, Stratford, Conn.

Application March 25, 1932, Serial No. 601,165

1 Claim. (Cl. 43—47)

This invention relates to fish lures.

An object of this invention is to provide a casting plug which, when drawn through the water, will resemble a fish and which will give the appearance of animation, and yet which can be made of light, bright metal so as not to be too heavy and sink to undesired depths when being reeled-in at normal speed.

Another object of this invention is to provide a fish lure which may be used either as a spinner or as a plug in casting or trolling.

A further object of this invention is to provide a body portion for a fish lure which may be made by casting and thereby decrease the cost of its production, and yet which may be made of bright metal so as to have smooth, polished surfaces reflecting light to attract the fish.

A still further object of this invention is to provide a rotating form of fish lure with colored beads extending axially thereof so as to attract the fish and so arranging the body that some of the beads will be visible when the body is viewed from any point about the axis of the same, or, in other words, so that some of the beads will be visible from the side of the body at all points in the rotation of the body about the axis. Preferably, surfaces of the blades forming the body are concave so as to varyingly magnify reflections of the beads as the body rotates.

And still a further object of this invention is to provide a rotating type of body, more or less skeletonized so as to reduce its weight, and yet so arranged that when it rotates it will give in optical illusion the appearance of an ellipsoid resembling a fish in motion.

Other features and advantages will hereinafter appear, in connection with the following description and the accompanying drawing, in which—

Figure 1 is a side elevation of one embodiment of the fish lure of this invention.

Fig. 2 is a similar view, showing the body portion rotated 90° from the position shown in Fig. 1.

Fig. 3 is a view similar to Figs. 1 and 2, but showing the appearance which the body produces in optical illusion when rotated.

Fig. 4 is an end view of the lure looking at it from the left, as viewed in Fig. 1.

Fig. 5 is an end view of the lure looking at it from the right, as viewed in Fig. 1.

Fig. 6 is a sectional view taken on the line 6—6 of Fig. 1.

The fish lure of this invention is, as stated above, adapted for use as either a spinner or a casting plug. When used as the latter, it has the advantage of attracting fish to it, not only by reason of its movement through the water, but also by reason of its rotation.

In the embodiment of the invention illustrated in the accompanying drawing, the fish lure comprises a body 10 which is preferably made of light, bright metal, such as aluminum. At the head end 11 and tail end 12 of the body there are provided bearing holes 13 through which a leader or wire 14 extends. One end of this wire is provided with a loop 15 to which the end of the fish line is attached, while the other end is provided with a loop 16 to which the fish hook 17, containing one or more barbs 18, is attached.

The body 10 is elongated and between the bearing portions 11 and 12 it has a pair of blades 19 symmetrically arranged at opposite sides of its axis. The blades 19, which are shown in section in Fig. 6, merge with the bearing portions 11 and 12, as indicated in Figs. 4 and 5. The body considered as a whole has a twist from the head end 11 to the tail end 12 so that the blades 19 lie in a helical plane forming helical flutes. Hence, when the lure is drawn through the water or is acted upon by a current, the body 10 is caused to rotate. The body 10 accordingly is in the form of a two-bladed high-pitched propeller or screw and the blades 19, as well as the head end 11, is so formed as to produce very little resistance to the movement of the lure through the water.

Of course, it should be understood that when the body is made (as is at present preferred) by casting the same, it is not physically twisted and the word "twist" as used herein and in the appended claim should be understood to be used as a noun, connoting the helical form of the blades.

Of course, it is within the purview of this invention to make the body of sheet metal and then actually and physically twist it around.

The surfaces 19a and 19b of the blades, being bright and polished, varyingly reflect light as the body 10 is rotated, thereby attracting fish to the lure.

To further attract the fish, the wire 14 may be provided with beads 20 at its head end between the end 11 of the body and the loop 15, and, likewise, beads 21 may be provided between the tail end 12 of the body and the loop 16, and these serve as a form of anti-friction bearings between the body and the loop 16. These beads are preferably colored beads, and it is also preferred that they be of different colors such as red and green.

To still further attract the fish and give the appearance of coloring on the side of the lure, the body 10 is provided with an apertured portion 22 located in axial alignment with the bearings 13 and on the portion of the wire 14 exposed by the aperture there is provided a row of beads 23, also preferably colored and of alternating colors such as red and green.

While it is not essential, it is preferable that the beads 20, 21 and 23 be cut or otherwise provided with facets to increase the reflection of light therefrom.

The aperture 22 and the beads therein intersect the helical planes in which the blades 19 lie in such a way that some of the beads will be visible when the body is viewed from any point about the axis of the same, so that even if the body 10 should not be spinning at the time the fish approaches it, at least some of the beads will be visible, no matter from what angle the fish approaches.

In the same way, some of the beads 23 will always be in plain sight when the body is rotating, for, as shown in Fig. 2, the end beads are visible while the intermediate beads are being hid by the blade portion 19.

The blades are, as shown, comparatively thin and only hide the beads 23 from view momentarily. Hence, when the body is rotating through the water at normal speed, the time during which any bead is cut-off from view is so slight that the beads appear to be seen continuously.

In spite of the fact that while still the body 10 does not have the appearance of a fish, especially as viewed in Fig. 2, because of the high-pitch helical formation of the blades, it is, nevertheless, a fact that as the body is rotated at normal speed while being drawn through the water, it has the appearance or optical illusion as indicated in Fig. 3, of being an ellipsoid resembling a fish.

The surfaces 19a and 19b of the blades may be flat or plain, as desired. However, it is preferable that the blades on one side be concave, for instance, on the side 19b in the form shown, so that the reflection from the beads on the surface 19b will be varyingly modified as the body rotates, thereby further attracting the attention of the fish. The other sides 19b of the blades are preferably made convex so as to reduce the resistance offered by these sides to rotation of the body.

By making the body of a high pitch, helical, propeller-like screw and having the amount of twist no greater than one twist divided by the number of blades or threads, it is possible to make the body 10 as an ordinary sand casting. This may be done very economically and thus permits the lure to be sold at a popular price. In the form shown, there are two threads or blades 19 and the twist from head to tail is one half a turn.

Variations and modifications may be made within the scope of this invention and portions of the improvements may be used without others.

Having thus described the invention, what is claimed as new and for which it is desired to obtain Letters Patent, is:—

A fish lure comprising a blade-like body portion of cast metal having a pair of flutes extending from head to tail of approximately one-half a turn to form a double-lead high pitch screw to rotate when drawn through the water; solid bearing portions at the head and tail of the body; a wire running through holes in said bearing portions, the portion of the body in line with said holes and between said bearing portions being apertured and exposing said wire; and beads threaded on said exposed portion of said wire and located in said aperture.

AXEL E. THORNBERG.